Dec. 31, 1968 C. T. LETTER 3,419,905
SYNCHRONOUS MACHINE
Filed Oct. 13, 1965
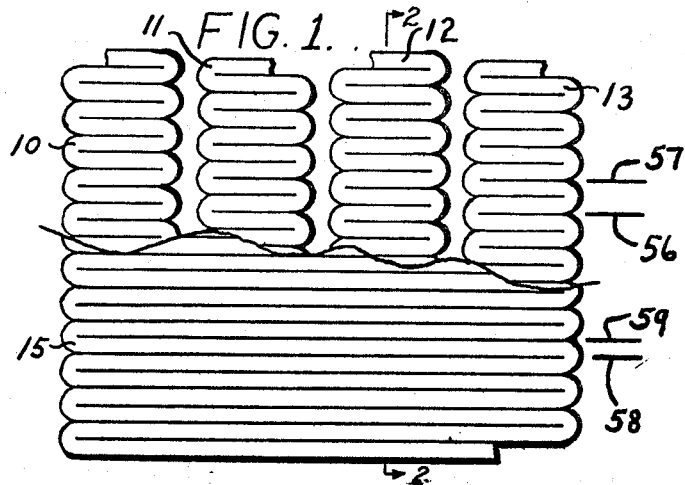
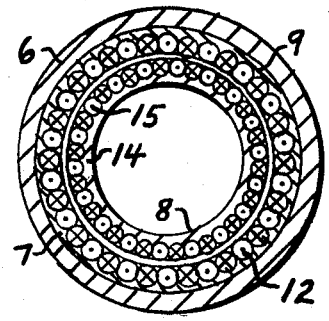

United States Patent Office 3,419,905
Patented Dec. 31, 1968

3,419,905
SYNCHRONOUS MACHINE
Carl T. Letter, Lower Graniteville, Vt.
(35 Merchant St., Barre, Vt. 05641)
Filed Oct. 13, 1965, Ser. No. 495,493
8 Claims. (Cl. 318—165)

ABSTRACT OF THE DISCLOSURE

A rotating electrical machine utilizes single layer windings formed on the surface of a support structure with turns in the shape of a linear conductor folded back and forth upon the support surface thereby providing individual turns which create a ring of alternating north and south magnetic poles between adjacent conductors. A continuous rotor winding extends over a plurality of stator windings which are spatially phase displaced around the stator. The stator may be energized by signals of different frequency and electrical phase corresponding to the spatial phase displacement. When used as a motor the rotor speed varies in accordance with the frequency difference of the signals and when used as a generator sum or difference frequency components are produced.

BACKGROUND OF THE INVENTION

This invention relates to the field of synchronous machines and particularly to the structure of such machines which employ single layer windings and the energization thereof to provide operation with one or more different frequency signals.

Prior art synchronous machines have generally been relatively complex and high inertia devices which are not capable of operating at high frequencies and which are not capable of following frequency changes with a fast response due to the inertia of the rotating part and the friction of associated slip rings and brushes.

SUMMARY

The present invention provides for high speed of synchronization response and low inertia construction to permit a synchronous machine to operate at higher frequencies than heretofore available, while at the same time permitting the machine to be extended into such fields of use as filters and frequency summing applications by virtue of the construction which minimizes high frequency losses and utilizes structure capable of giving the desired result. In particular, the machine is constructed of single layer windings which are formed by a continuous conductor folded back and forth upon itself to define adjacent turns of the winding which, with current flow through the winding, produces a succession of alternate north and south poles between the conductors of the winding. By virtue of the contruction of the rotor and stator to provide very close spacing between the rotor and stator windings, these magnetic poles are capable of inducing maximum response in the adjacent turns of the other winding, thereby providing the necessary induction without resorting to the massive core structures of the prior art. With such low inertia rotating components the machine of the present invention is capable of rotor speeds well adapted for applications heretofore reserved for all-electronic type circuits and by employing a plurality of sets of windings on the stator, permits the device to perform functions such as frequency addition and substraction and filtering at what are ordinarily considered to be signalling frequencies in the electronic art.

It is, accordingly, the principal object of the present invention to provide a synchronous machine capable of high speed of response to varying frequency synchronizing inputs and capable of rotor speeds which permit signal translation between the various windings of the stator and rotor to be accomplished.

BRIEF DESCRIPTION OF THE DRAWINGS

FIG. 1 is a developed representation of a four winding stator and single winding rotor in accordance with the invention;

FIG. 2 is a cross-sectional view of one form of rotating synchronous machine employing a winding configuration such as shown in FIG. 1;

DESCRIPTION OF THE PREFERRED EMBODIMENTS

Only motor applications of the synchronous machine of this invention are presented in the following description, but the adaptation of said machine to generator applications should be obvious to those skilled in the electrical art, as should other applications not mentioned herein, falling within the spirit of the invention as defined by the scope of the appended claims.

Regarding the operation of the machine of this invention as a generator, it can be generally stated that it is commonly known to skilled electrical artisans that the typical electrical motor is structurally equivalent to a generator, also, and that the modification from motor to generator can be accomplished merely by removing some of the motor's stator winding input signals, and using said non-signal-fed stator windings as the generator signal output windings; and also by mechanically rotating the rotor or rotors of said motor. The machine of this invention is no exception to this general rule.

The said machine of this invention uses a non-inductive type of winding which enables very wide frequency response of said machine.

The rotor member or members of the machine of this invention may be vacuum-sealed for air-friction reduction, thereby increasing the given machine's maximum speed limit of synchronous operation.

Referring now to FIG. 1, a set of stator windings 10, 11, 12 and 13 is shown in relation to a rotor winding 15.

Figure 3:
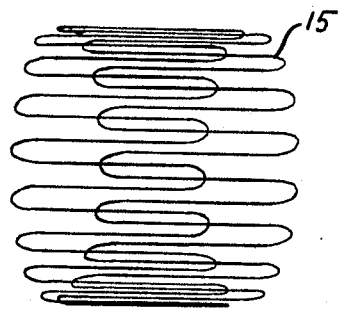
FIG. 3 is a pespective view of a rotor winding in accordance with the invention.
Figure 4:
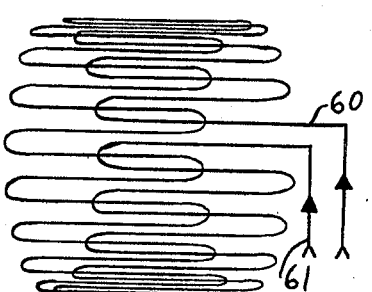
FIG. 4 is a perspective view of any one of the plural stator windings in accordance with the invention.

It is to be noted that any of the rotor or stator windings described in this specification is non-inductively and single-layered wound. Each of the windings, used in the configuration of FIGURES 1 and 2, defines a substantially cylindrical shape, as FIGURES 3 and 4 perhaps show more vividly. FIGURE 3 represents a perspective view of the lineal path of a given "closed-loop" rotor winding 15 pattern, and FIGURE 4 represents the perspective view of the lineal path of a given stator winding, 10, 11, 12, or 13, pattern—said patterns being of the preferred winding design used for the machine of this invention. It is to be further noted that the same basic winding design, used throughout this specification, consists essentially of a length of electrically conductive material which alternately reverses direction along the cylindrical path of said winding, virtually all portions of the given typical winding remaining substantially mutually parallel, thereby, and adjacent portions of said winding preferably being as close to one another as minimum electrical insulation requirements will permit.

FIGURE 1 is an accurate drawing, shown on a two-dimensional plane, of the winding design of the preferred embodiment of the machine of this invention, which is the use of four stator windings 10, 11, 12, and 13 corresponding to one given rotor winding 15.

An individual turn of stator winding 13 is represented in FIGURE 1 by the portion of said stator winding 13 which is substantially included between the linear extensions of the straight lines 56 and 57, or, a "U-shaped" conductor portion of said stator winding 13. An individual half-turn of rotor winding 15 is represented in FIGURE 1 by the portion of said rotor winding 15 which is substantially included between the linear extensions of the straight lines 58 and 59, or, merely a single straight conductor portion of said rotor winding 15.

The individual turns or individual half-turns of any of the windings in FIGURE 1, or in any of the other drawings of this specification depicting said windings, are defined as such in the same abovementioned manner, which, more simply stated, is that an individual half-turn consists merely of a straight piece of electrically conductive material, and an individual turn consists of two such straight pieces of electrically conductive material, oriented in very close parallel juxta-position, and electrically joined at one of their two common ends. This is the preferred winding design set forth herein, though other designs may occur to those skilled in the art.

Another extremely important winding design consideration is that the individual half-turns and individual turns be uniformly spaced, and that a given rotor winding 15, or stator winding 10, 11, 12, or 13, of a given rotor-stator set, have the same linear, or angular, spacing, between its individual half-turns or individual turns, as does any of the other windings of said set.

Since a given winding, of the preferred design set forth herein, desirably encompasses a full angular 360° of a cylindrical plane, the combination of this and the above requirements suggests that each winding, of a given rotor-stator set of windings, should have the same number of individual turns as the number of individual turns of any other winding of said set. A more general way of explaining the preferred winding design is to pose the requirement that a given non-inductive rotor winding 15, having uniformly-spaced individual turns, should, during a given instant in time, have substantially the same mechanical phase relationship between any given one of its individual turns and the individual turn, nearest said individual rotor turn, of a given corresponding stator winding 10, 11, 12, or 13.

Figure 5:
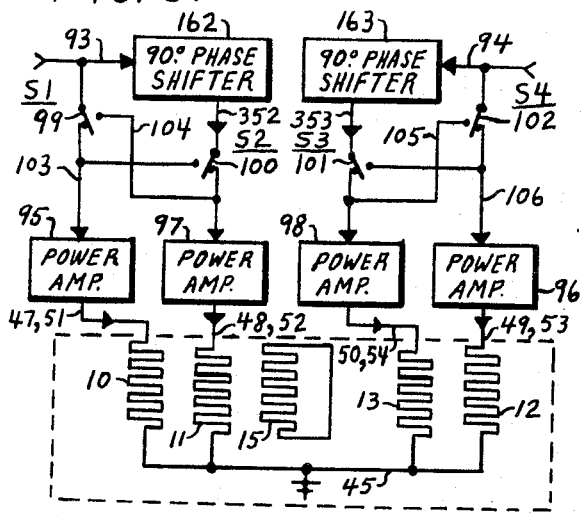
FIG. 5 is a block diagram representing energizing circuits for the synchronous machine in accordance with the invention.

The preferred winding design of the machine of this invention, as best depicted mechanically in FIGURE 1 and schematically in FIGURE 5 within the dotted rectangle, is such that each of the stator windings 10, 11, 12, and 13 bears a positional relationship, to the corresponding rotor winding 15, of contiguity to a degree at least adequate for appropriate mutual electromagnetic interaction, without any substantial electrical shorting thereby resulting between any of said windings.

As FIGURE 1 most clearly illustrates, this requirement can well be fulfilled by maintaining the width of any and each of the stator windings 10, 11, 12, and 13, the same, or about one-fourth the width of the rotor winding 15, in order to maximize the areas of electromagnetic interaction between said rotor and stator windings, while not "favoring" any particular stator winding electromagnetically.

Another extremely fine design requirement, for the preferred winding pattern of FIGURE 1, is that a special fixed mechanical phasing relationship must exist between some of the stator windings 10, 11, 12 and 13, if the winding design is to enable proper operation of the given motor or alternator, of this invention, employing said winding design.

That phase relationship is a fixed 90° mechanical phase displacement between two of the four stator windings 10, 11, 12, and 13, and also a fixed 90° mechanical phase displacement between the remaining two of said four stator windings, 10, 11, 12, and 13. In FIGURE 1 is shown, fairly accurately, a 90° mechanical phase relationship between stator windings 10 and 11, and a 90° mechanical phase relationship between stator windings 12 and 13.

If it will clarify the phase designations in FIGURE 1 the shortest distance between parallel lines 57 and 56 represents approximately 360° of mechanical winding phase, and the shortest distance between parallel lines 58 and 59 represents approximately 180° of mechanical winding phase, on the scale of the FIGURE 1 drawing, of course.

The fixed mechanical phasing relationship between a given two stator windings of a given stator 7 is optional. Generally speaking, however, the fixed mechanical phase relationship between a given two of the stator windings, of the preferred machine winding design of FIGURE 1, that aren't required to be 90° phase-displaced relative to each other, such as stator windings 11 and 13 or stator windings 10 and 12 of said FIGURE 1—is preferably either 0° or 180°. FIG. 1 depicts a fixed 0° mechanical phase relationship between stator windings 10 and 12, and also between stator windings 11 and 13.

FIGURE 2, which is a view on line 2—2 of FIGURE 1, shows cross-sectionally the relative concentric positional relationship, a housing 6, a stator 7, consisting of a stator form 9 and the stator windings, of which stator winding 12 is shown, and a rotor, consisting of a rotor form 14 and the rotor winding 15.

FIGURE 2 shows well the manner in which the windings, or rotor winding 15 and stator winding 12 in the FIGURE 2 example, fully encircle a corresponding cylindrical rotor form 14 and cylindrical stator form 9 with uniform spacing. The cross-sectional portions of the said rotor winding 15 and stator winding 12, in FIGURE 2, are each represented by the circular patterns of small circles enclosing alternately "X" and dot marks. The "X'd" circles represent the conductive cross-sections of individual half turns, wherein a given instantaneous current, assumed for the purpose of explanation, is flowing "into" the plane surface of the drawing FIG. 2; and the dotted circles represent the conductive cross-sections wherein said given instantaneous current is flowing from the plane surface of the said drawing FIG. 2. Each such "X'd" or dotted small circle in FIGURE 2 represents, of course, approximately a half-turn cross-section. It is to be noted that the rotor winding 15 of FIGURE 2 has the same number of evenly-spaced individual half-turns, or individual turns, as the corresponding stator winding 12 has, in said FIGURE 2.

Figure 6:
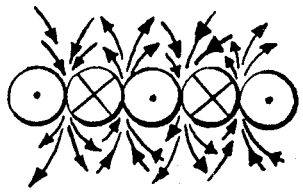
FIG. 6 is a sectional view of a portion of a winding useful in explaining the development of the alternate magnetic poles.

It can also be seen that the non-inductive winding of this invention, as set forth herein, such as in said FIGURE 2, is capable of generating magnetic poles of alternate polarities between the individual half-turns of said winding. When the "left-hand rule" for current flow through conductors is applied to the typical windings in FIGURE 2, it is seen that a given pair of adjacent electrically conductive half turn segments will generate between them a magnetic pole of a polarity dependent upon the polarity of the current flowing through said segments. The flux lines between such adjacent half-turns, of the given winding, are mutually reenforcing, a characteristic inherent in the non-inductive type of winding employed in this invention. Each rotor or stator winding, therefore, acts as the equivalent of a cylindrical row of magnets of alternate polarities, all mutually parallel, which vary in magnetic polarities in accordance with the electrical polarity of the instantaneous current flowing through said winding. FIGURE 6 is an enlarged cross-sectional view of a portion of such a noninductive winding as in FIGURE 2, with the dotted or "X'd" circles symbolizing current flow out of or into the given page, as above explained, and arrows to indicate the magnetic flux paths corresponding to the instantaneous polarity of current flow depicted in said FIGURE 6.

FIGURE 5 is the required stator 7 input circuit used in the filtering configuration such as with two frequency inputs described below. The FIGURE 5 circuit functions as follows:

Alternating-current (A.C.) signals are applied to the FIGURE 5 circuitry through lines 93 and 94, to the stator windings through appropriate input circuitry. The A.C. signal through line 93 reaches "90° Phase Shifter" 162, which shifts the phase of said A.C. signal by the same 90° of electrical phase, across a wide frequency range of said A.C. signal, and applies said phase-shifted signal through line 352, "off" contacts 100 of a switch S2, and line 104 to a power amplifier 97, which power amplifies said phase-shifted A.C. signal and applies it to stator winding 11 through line 48.

Returning to the operation of said FIGURE 5 circuit, the signal on line 93 also goes directly to a power amplifier 95 through "off" contacts 99 of a switch S1 and line 103; power amplifier 95 then sends said power amplified signal to stator winding 10 through line 47.

The A.C. signal on line 94 is similarly applied to stator windings 12 and 13—not phase-shifted, through contacts 102 of a switch S4, line 106, a power amplifier 96, and line 49 to stator winding 12; and phase-shifted, by means of a "90° Phase-Shifter" 163, through line 353, "off" contacts 101 of a switch S3, line 105, a power amplifier 98, line 50 to stator winding 13. The signals applied to stator windings 10 and 11, in said FIGURE 5, are switched by throwing both S1 switch 99 and S2 switch 100 to their "on" positions; similarly, throwing S3 switch 101 and S4 switch 102 both "on" switches the signals applied to stator windings 12 and 13.

Said switches, S1, S2, S3 and S4 are important, because they enable control of the direction of rotation of the rotor and also enable selection of the sideband, upper or lower, frequency, of the said two A.C. input signals applied through lines 93 and 94 which sideband frequency the rotor (supporting rotor winding 15) will synchronize to. The FIGURE 5 circuitry, properly operated as above described, causes, in conjunction with appropriate design of the stator windings 10, 11, 12, and 13, and rotor winding 15, as was explained above in conjunction with the FIGURE 1 winding design, electromagnetic fields to effectively rotate about the stator windings, at the frequency, from individual stator turn to individual stator turn, of the one signal, from either line 93 or line 94, causing said electromagnetic field to so rotate.

If both rotating electromagnetic fields, generated in the stator windings 10 and 11, in the case of one of said rotating fields, by the A.C. signals derived from the A.C. signal on line 93; and generated in stator windings 12 and 13, in the case of the second of said two rotating fields, by the two A.C. signals derived from the A.C. signal on line 94 are present two conditions are possible.

If both of said fields are rotating in the same direction, the rotor 8 will tend to synchronize only to the sum frequency, or upper sideband, of the frequencies of the two said A.C. input signals from lines 93 and 94, which A.C. signals are causes of said two rotating electromagnetic fields. If one of said fields is counterrotating with respect to the other of said fields, relative to the fixed stator windings, of course, the rotor 8, corresponding to said stator windings generating said fields will tend to synchronize to the difference frequency, or lower sideband, of the frequencies of said two A.C. signals from lines 93 and 94.

Many modifications of the invention will now be apparent to those skilled in the art and are to be considered within the scope of the invention as defined by the appended claims.

I claim:
1. A rotating machine comprising:
   a stator having a plurality of sets of windings each winding of a set having:
      a plurality of single layer turns, each turn being in the form of a linear conductor folded back upon itself and adjacent turns being a continuation of said conductor folded back and forth separated by the dielectric between said conductors thereby defining a ring of alternating north and south magnetic poles between said conductors when a current flows through the conductors of a winding;
   support means disposing said plurality of sets of windings with each winding extending around a closed path and the windings within a set having a spatial phase displaced relation around said path, the phase displacement being a portion of a space cycle defined by two adjacent windings embracing adjacent north and south poles;
   a rotor having a winding with a plurality of single layer turns each turn being in the form of a linear conductor folded back upon itself and adjacent turns being a continuation of said conductor folded back and forth separated by the dielectric between conductors and with the ends of the conductor of the first and last turns joined to provide a continuous closed circuit path; the conductors of said rotor winding extending to lie adjacent the conductors of each set of windings on said stator;
   support means disposing said rotor winding for rotation closely adjacent to the windings of said stator with the conductors of said rotor and stator generally parallel and the plane of the rotor winding approximately normal to the axes of said north and south magnetic poles; and
   means for making separate electrical connection to said sets of windings on said stator.

2. Apparatus according to claim 1 in which said means for making separate electrical connection includes means for energizing each of said sets on said stator with predetermined frequency signals and means for energizing the windings within any set by signals having relative electrical phase corresponding to the spatial phase of the windings of the set.

3. Apparatus according to claim 2 in which said sets are energized with different predetermined frequency signals.

4. A machine according to claim 1 in which said sets of windings on said stator are disposed on the interior cylindrical surface of a stator support and the winding on said rotor is disposed on the exterior cylindrical surface of a rotor support, said cylindrical surfaces being concentric and said rotor support mounted for rotation about the axis of said cylindrical surfaces within and closely spaced from said interior cylindrical surface.

5. A machine according to claim 1 in which said stator has two sets and each set has two windings, the windings within each set being positioned with substantially 90° relative spatial phase.

6. A rotating machine according to claim 5 and including means for energizing one set of said stator windings with predetermined frequency signals of zero and 90° leading phase and means for energizing the other set of said stator windings with predetermined frequency signals of zero and 90° lagging phase.

7. Apparatus according to claim 6 in which said sets are energized with two different frequencies.

8. Apparatus according to claim 5 in which the turns of all of said windings have substantially the same pitch to provide substantially uniformly spaced magnetic poles for each of said windings.

References Cited

UNITED STATES PATENTS

| | | | |
|---|---|---|---|
| 1,970,914 | 8/1934 | Kilbourne | 318—165 XR |
| 3,090,880 | 5/1963 | Raymond | 310—179 XR |
| 3,199,010 | 8/1965 | Robinson et al. | 318—165 |

ORIS L. RADER, *Primary Examiner.*

GENE RUBINSON, *Assistant Examiner.*

U.S. Cl. X.R.

310—179, 180, 195, 210